July 5, 1966
W. H. COULTER ETAL
3,259,842
PARTICLE ANALYZING DEVICE
Filed Aug. 19, 1959
5 Sheets-Sheet 3
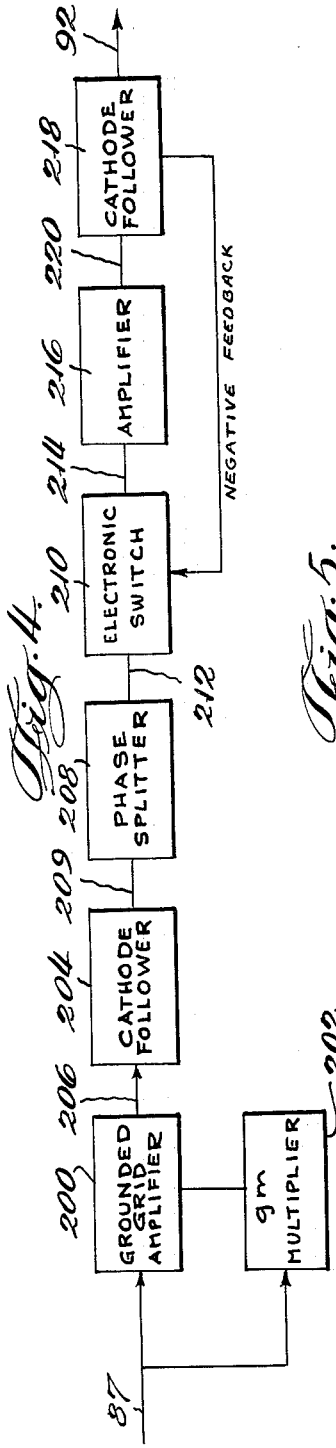
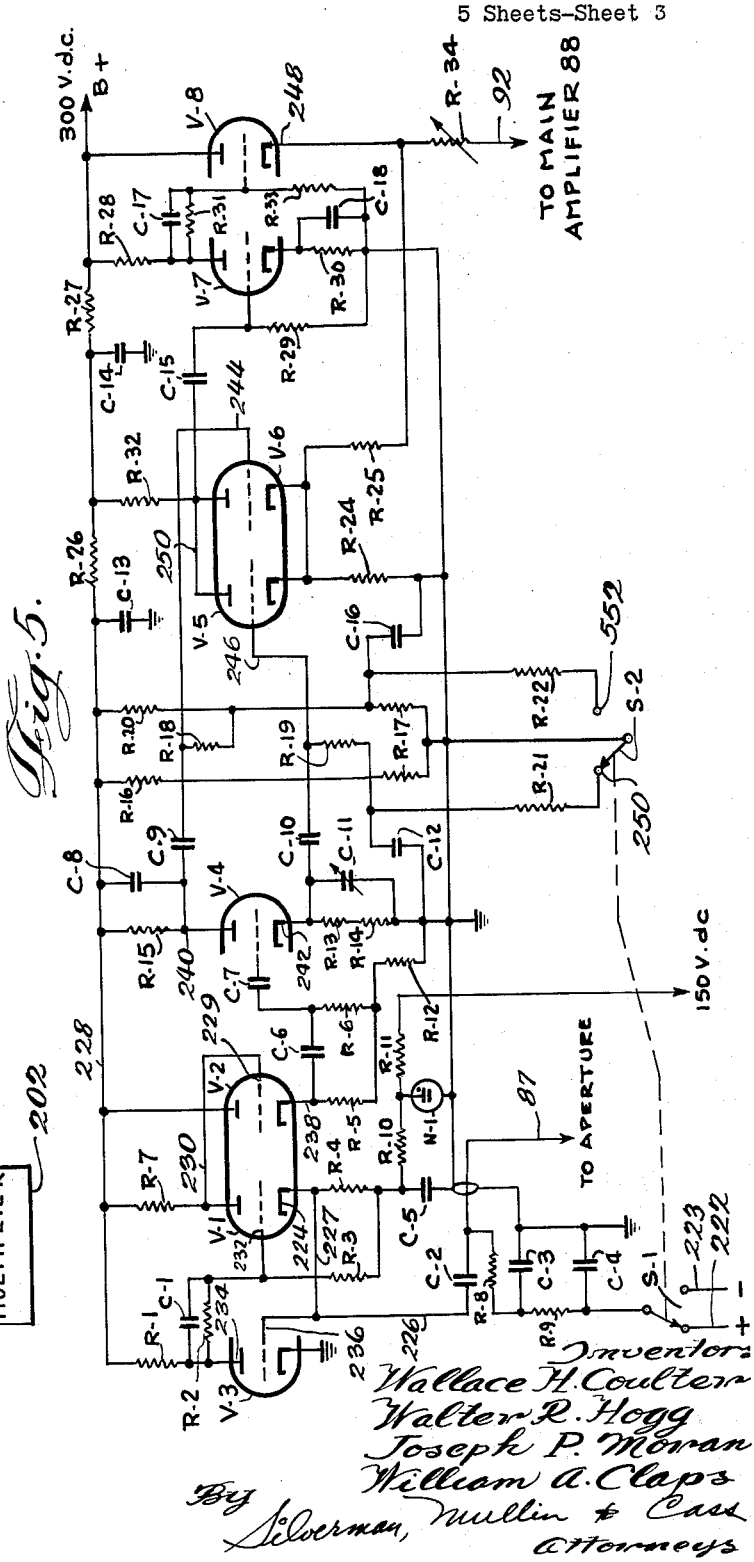
Inventors
Wallace H. Coulter
Walter R. Hogg
Joseph P. Moran
William A. Claps
By Silverman, Mullin & Cass
Attorneys July 5, 1966 W. H. COULTER ETAL 3,259,842
PARTICLE ANALYZING DEVICE
Filed Aug. 19, 1959 5 Sheets-Sheet 4

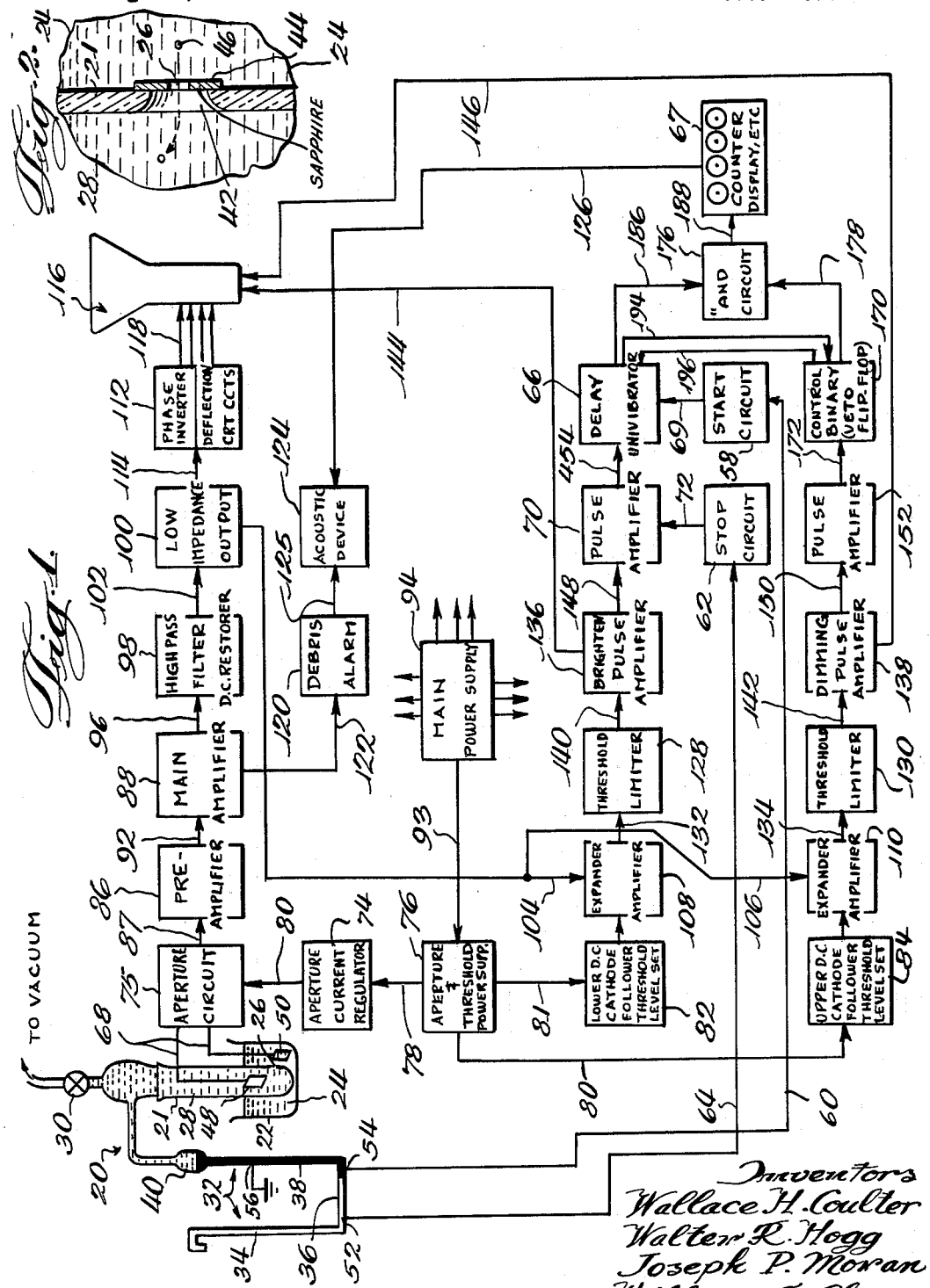

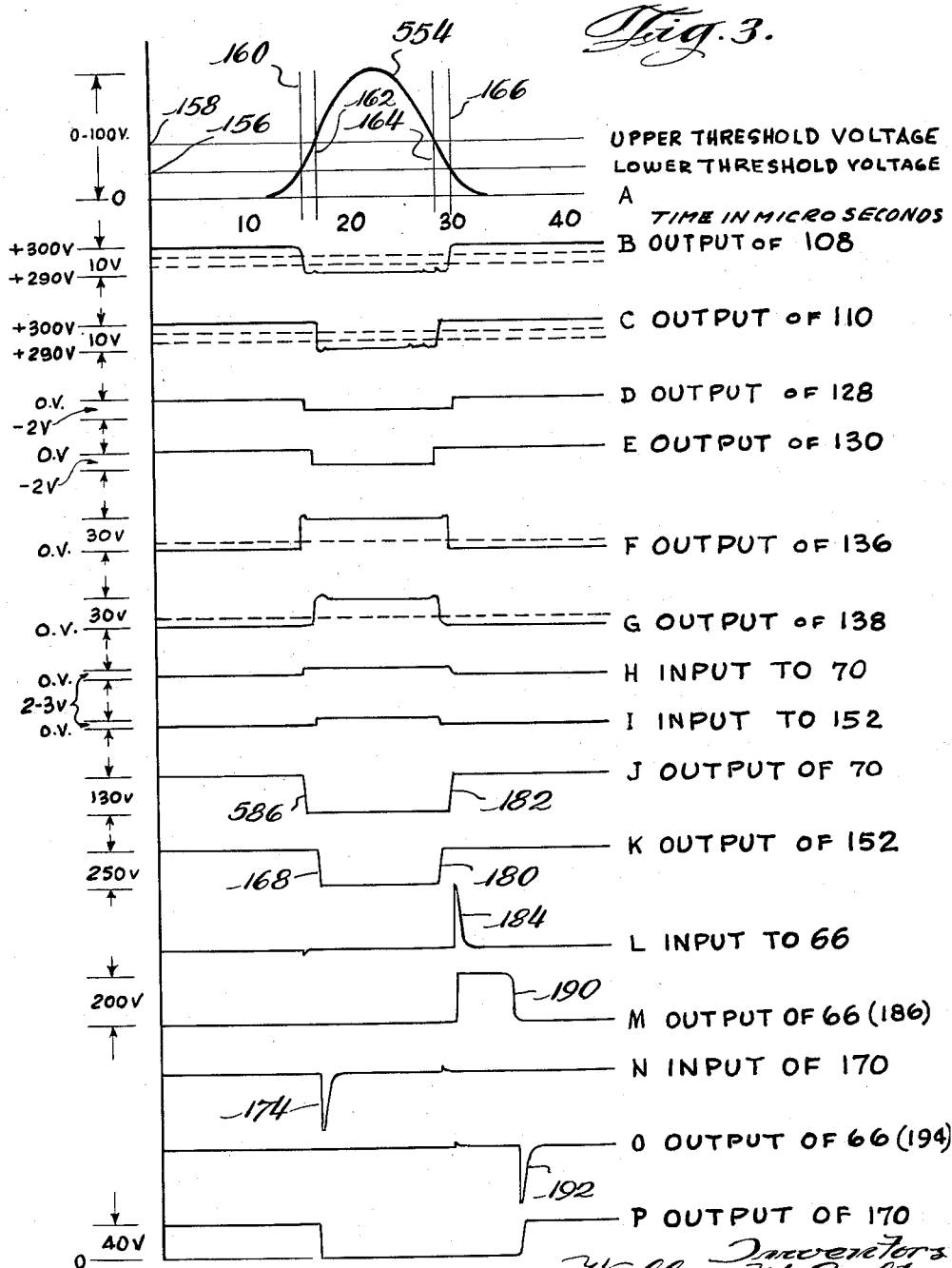

Inventors
Wallace H. Coulter
Walter R. Hogg
Joseph D. Moran
William A. Claps
By Silverman, Mullin & Cass
Attorneys

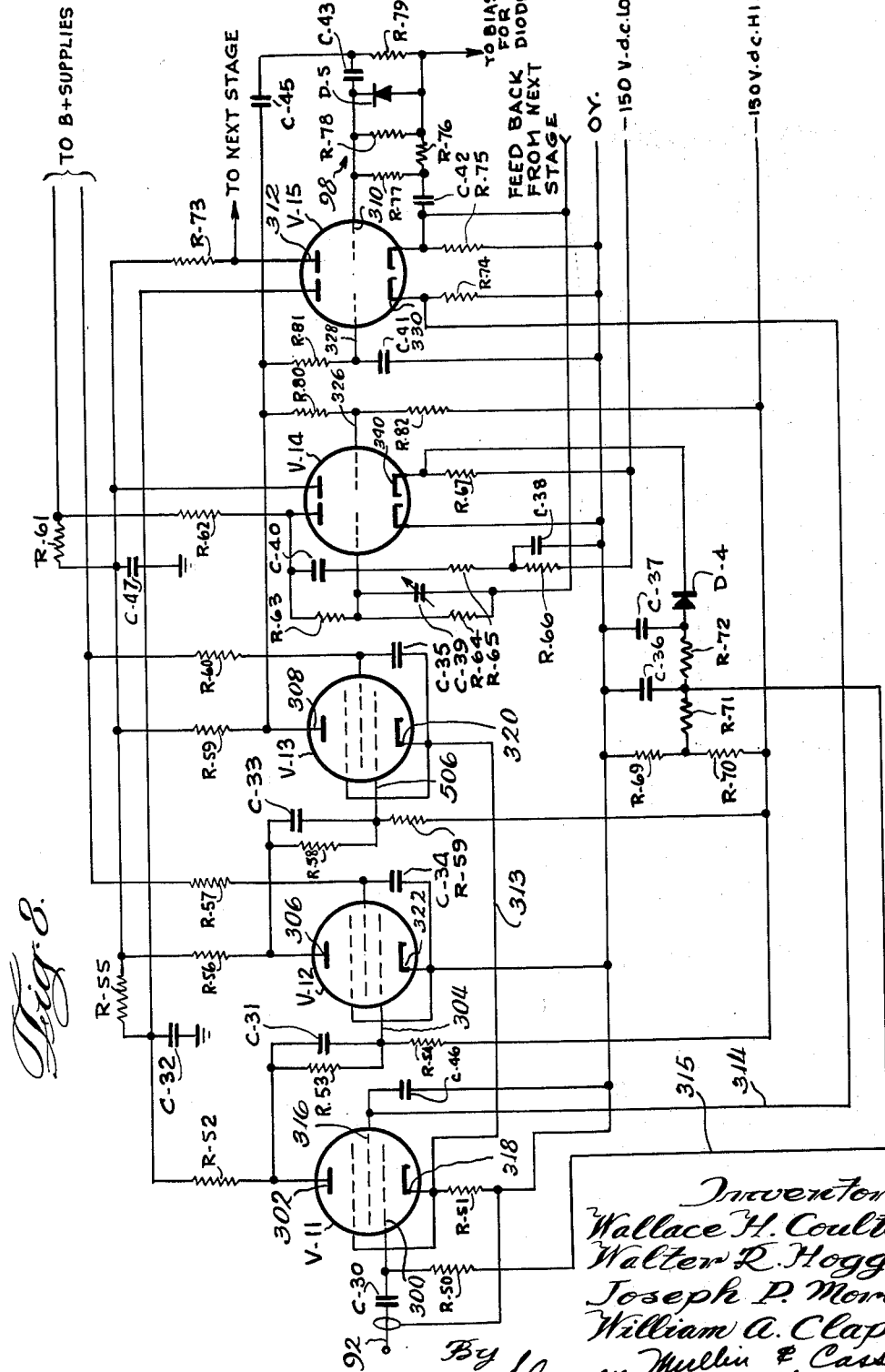

United States Patent Office 3,259,842
Patented July 5, 1966

3,259,842
PARTICLE ANALYZING DEVICE
Wallace H. Coulter, Walter R. Hogg, Joseph P. Moran, and William A. Claps, all of Chicago, Ill., assignors to Coulter Electronics, Inc., Chicago, Ill., a corporation of Illinois
Filed Aug. 19, 1959, Ser. No. 834,860
15 Claims. (Cl. 324—71)

INTRODUCTION

This invention relates generally to the art of studying particles and more particularly is concerned with a structure for use in counting, sizing, and analyzing particles which are suspended in a liquid medium.

The basic structure of an apparatus of the general type here involved is described and claimed in U.S. Patent No. 2,656,508 which issued October 20, 1953 to Wallace H. Coulter, one of the applicants herein. In the structure described in said patent, an aperture is provided in the wall of an insulated vessel, such as, for example, adjacent the bottom end of a glass test tube, the aperture being of the order of several to several hundred microns in diameter, depending upon the nature of the particles being studied. A suspension of the particles is prepared in a suitable liquid, the electrical impedance per unit volume of which is different from that of the particles, and of known dilution in the case that an accurate count is one of the objects of study. Where necessary, the liquid impedance can be changed to provide sufficient contrast with the particles. Another preferably insulated vessel, such as a glass beaker, is provided with a quantity of the suspension, the aperture of the first vessel being submerged in the suspension in the second vessel. A pressure differential is established between the two vessels so that the suspension will pass through the aperture from the second or outer vessel to the first or inner vessel. Where the apparatus is intended to count the particles, the rate of flow is known or ascertainable.

An electric current flow is established between the two vessels by suspending electrodes in the respective bodies of the suspension, or in certain cases, an electrical field may be established by suitable means. The only fluid connection between the two bodies is through the aperture, and hence a current flow or potential is established in the aperture.

The particles may be microscopic or macroscopic, and may comprise blood cells, bacteria, and many other organic or biological particles; or may comprise inorganic particles such as alumina, metal powders, ink, mud, petroleum catalysts, and the like. The only requirement is that the particles be small enough to pass through the aperture along with the suspending fluid, and that their impedance per unit volume and that of the fluid are or can be made detectably different. This latter requirement is usually true for most particles and liquids which will carry same in suspension. Sufficient homogeneity is assured through mixing and agitation if required.

As each particle passes through the aperture, for the duration of the passage, the impedance of the contents of the aperture will change, thereby modulating the current flow or electric field in the aperture, and hence causing a signal to be applied to a detector suitably arranged to respond to such change. A common arrangement is to have the signal thus developed applied to the input of an amplifier which in turn drives some form of indicating or measuring or recording device. This would include display counters, cathode ray tubes, recording counters and writing devices.

A study of the characteristics of particles passing through the aperture of apparatus constructed in accordance with the said Patent 2,656,508 (Electronic Counting and Sizing of Bacteria, by H. E. Kubitschek, Nature, vol. 182, pp. 234–235, July 26, 1958) has shown that the change in resistance of the contents of the aperture as a particle passes through it is proportional to the volume $v$ of the particle where the cross sectional area of the particle is substantially smaller than the cross sectional area of the aperture, and the particle is smaller in diameter than the axial length of the aperture.

The apparatus of said Coulter Patent 2,656,508 was constructed with a detector that included an amplifier to the input of which there was applied a voltage $e_0$, representing the voltage change caused across the contents of the aperture by the passage of a particle.

Each particle passing through the aperture produced a signal in the form of a pulse in the amplifier which could be counted or applied to a circuit for measuring its amplitude. The number of signals received for a given volume of fluid can be related to the actual particle concentration, providing the dilution is known. Likewise, through suitable calibration, the amplitude of signals could be related to the volume of the particles and circuit adjustments made to size the particles in a given suspension. For counting, statistical measurements were used to provide compensation for coincident counts.

In the commercially produced structure embodying the said Coulter Patent 2,656,508, the signals were amplified and applied to a cathode ray tube so that the passage of particles could be displayed on the cathode ray tube as vertical spikes on a horizontal base line. Adjustment of a threshold circuit enables the passage of only certain amplitude signals to the counting device, enabling the counting of certain size particles or for purposes of ascertaining population of different sizes of particles irrespective of count.

Scanning was accomplished in the said commercial structure through the use of apparatus described and claimed in U.S. Patent No. 2,869,078 which issued January 13, 1959 to Wallace H. Coulter, one of the applicants herein, and Joseph R. Coulter, Jr. In that structure, the inner or first vessel was subjected to a vacuum so that the suspension was drawn through the aperture from the body of fluid in the outer or second vessel so that the particles in suspension in the body of fluid in the outer vessel passed through the aperture into the inner vessel. This vacuum was obtained by first drawing up the mercury column on one arm of a manometer through the use of an external vacuum, then shutting off the external vacuum and permitting the mercury column to recede toward the open end of the manometer. The said one arm is fluidly connected with the body of suspension in the inner vessel, and as the mercury column recedes, it draws the suspension from the said inner vessel which, of course, in turn draws fluid through the aperture. In the path of the receding mercury are two electrodes, the column being itself grounded. The electrodes are between measured volumes of the capillary tube within which the mercury is contained, the first electrode when electrically contacted by the oncoming mercury establishing a circuit to ground to turn on the counting apparatus, and the second electrode when electrically contacted by the mercury establishing a circuit to ground to turn off the counting apparatus. Thus the structure was operated automatically merely by turning on and then turning off a source of external vacuum.

While the said commercial apparatus above referred to is now in extensive use throughout the world and is performing particle analysis satisfactorily, its universality and flexibility of use have been to some extent limited by certain disadvantages which have arisen; and which have been resolved only since the advent of the invention herein.

ACCOMPLISHMENTS AND OBJECTS OF INVENTION

The principal disadvantages relate to the basic concepts of the apparatus which may be considered in the following summarization, the brevity of which in no way indicates the complexity of the problem and its solution, and the order of which does not necessarily represent the order of importance. Moreover, it is not to be inferred from the categorization that any inventive concept applied to the solution of one problem is independent of effect upon any or all of the others.

(1) Loading of the contents of the aperture by the output circuit decreased the signal available at the load.

(2) The impedance of the contents of an aperture varies greatly with many factors commonly met in the use of the apparatus, as a result of which the aperture voltage $E_{ap}$ (see equation 1 below) varies. This causes variation in the signal output $e_0$ which can be a serious consequence. Variation of impedance renders invalid given corrections for aperture loading effects of series resistors of the current source.

(3) The error in proportionality of the output signal amplitude with particle volume when the size of the particles increased relative to the size of the aperture prevented the use of a given aperture for many different sizes of particles and curtailed the utility of a given aperture for study of suspensions having particles of widely divergent sizes.

The primary object of the invention is the provision of means for overcoming and obviating the disadvantages above set forth to the ends described hereinafter in connection with a detailed discussion of these disadvantages. Other objects achieved are the provision of particle analyzing apparatus which utilizes basic principles of the said Coulter Patent 2,656,508 to achieve a much more flexible, stable, reliable, accurate and simple structure which has a calibration substantially independent of aperture quiescent impedance changes.

Reference to simplicity in the above paragraph is concerned with the elimination of the need for involved calibration procedures and charts and adjustments, the nature of which were inherent in the commercially produced structure (which will be referred to hereinafter as the prior structure), and the achievement of which will become obvious with the description of the invention herein.

The invention has additional features which will be alluded to prior to detailed discussion of the solution of the three problems mentioned above.

The prior structure required a plurality of voltage regulation circuits each of which was concerned with a particular function. For example, it was required to maintain the voltage across the contents of the aperture constant and it was required to maintain the threshold circuit voltage source constant. Line voltage changes, loading effects and the replacement of components, for example, necessitated readjustment of all voltage regulation circuits in order to continuously maintain the proportionality of signal amplitude to pulse volume while the apparatus was being used. This was tied in with calibration.

It is an object of this invention to maintain the proportionality of signal amplitude to particle volume throughout the system by using a common supply source from which the voltages for the threshold circuits and the aperture current circuit are derived.

Another important object of the invention is to provide a pulse analyzing device in which there is a pair of variable level threshold voltages, by means of which the user may choose a level below which pulses are to be discarded and a second level above which pulses are to be discarded so that the pulses counted or analyzed occur only between the two thresholds. The invention also contemplates means whereby the counting circuit is rendered inoperative by a veto pulse when the pulse representing the passage of a particle exceeds the upper level as to its leading edge, and energizes the counting circuit when its trailing edge drops below the lower threshold. Other means provided by the invention uses the counting circuit energizing pulse for restoring the circuit producing said veto pulse.

Another object of the invention is the provision of the novel means for implementing the threshold circuits, comprising an arrangement which brightens the auxiliary oscilloscope display trace as it passes the lower threshold and dims it as it passes the second threshold, so that only that portion between thresholds is brightened.

Alluding now to the previously mentioned disadvantages enumerated, the discussion which follows details the same and indicates the objectives of the invention in offsetting said disadvantages.

Through analysis and study of the structure above described and a consideration of the objective sought herein, it has been discovered that a relationship can be used to express the nature of the phenomena if one assumes certain prerequisites. This relationship, once examined, appears to be relatively simple, notwithstanding the complexity of its derivation.

(1) $$e_0 = E_{ap} \, v/V - v_s$$

where:

$e_0$ = the signal voltage (A.C.)
$E_{ap}$ = the aperture voltage (D.C.)
$v$ = the volume of the particle
$V$ = the total volume of the aperture
$v_s$ = the shadow volume of the aperture, that is the volume occupied by the particle projected axially throughout the length of the aperture.

From the relationship of Equation 1 it can be seen that the proportionality is best when $v_s$ is so small as to be negligible, that is, when the particle is very much smaller than the aperture. The proportionality ratio introduces error as the value of $v$ increases relative to $V$. It will be apparent that if this equation holds true for most conditions, the signal voltage will be directly proportional to the volume of the particle, presuming that $V$ remains constant, which is true, and presuming further that $E_{ap}$ remains constant. The difficulty of keeping $E_{ap}$ constant is tied to the problem of maintaining the contents of the impedance of the aperture constant, but the desired results can be accomplished by maintaining $E_{ap}$ constant, and the invention herein contemplates that under certain circumstances this can be done to give an output $e_0$ which is independent of changes in the orifice impedance.

A more practical approach to the problem has been worked out of Equation 1 as will be seen.

The prior structure had an aperture current source that was of high impedance, say of the order of 50,000 ohms to 25 megohms, an aperture which was of relatively low impedance, say of the order of 15,000 ohms, and a load, the amplifier input, which was of the order of one megohm. Since this is a structure in which the sensing device is voltage sensitive, the most desirable arrangement is one in which the ratio of the combined load and current source impedance to the aperture is infinite, a situation which is equivalent to open circuit. According to the Equation 1 the signal voltage depends upon the voltage across the aperture, which in turn depends upon the impedance of the aperture. The load in said prior device comprises the input grid leak resistor of a vacuum tube, which is limited to resistance values of the order of one or two megohms because of the nature of vacuum tubes.

Whatever the nature of the ratio between the impedance of the aperture contents and those of the D.C. source and the amplifier input, it is not sufficiently definite in the prior structure. Variations in aperture impedance are caused by many factors, including temperature of the suspension fluid, conductivity of the fluid (which is deliberately varied in certain biological studies), changes in dimension of the aperture where different inner vessels are changed in studying varying characters of particles, and the like. Such variations cause variations in calibration, variations in the proportionality of pulse amplitude to particle volume and the like. Further, they render recording circuits used with the apparatus output unstable and unreliable.

The disadvantages of the basic structure of the prior device have been overcome by providing a constant current aperture supply, utilizing a regulated source of current the effective impedance of which is substantially infinite, and by providing a current sensitive amplifier, the input to which is of such low impedance as practically to comprise a short circuit. What has been accomplished through these structures is to make the aperture current insensitive to changes of impedance for any reason, whereby the impedance may change from several ohms to tens of thousands of ohms without in any way affecting the signal output; to decrease the error in proportionality of the signal to the volume of the particle as the volume approaches the volume of the aperture; to enable the handling of particles of widely diverging sizes in the same determination without the need for changing aperture and making circuit adjustments; to decrease if not eliminate the need for calibration adjustments and charts. It may be remarked in passing that in the prior structure some attempt was made to keep the current in the aperture at about the same value by providing a high voltage source having a number of different resistors in series with the source and changing from position to position with the exigencies of the situation. Each change resulted in a different calibration due to the different loading of the different value of series resistors.

The equation above referred to can be derived for the current in the aperture, and becomes the following:

(2) $\qquad i_0 = I_{ap} v/V - v_s$ where:

$i_0$ = the signal current in the amplifier input (A.C.)
$I_{ap}$ = the aperture current (D.C.)

and the remaining factors the same as in Equation 1.

In Equation 1 which represents an ideal structure of this invention, it is practically difficult to maintain $E_{ap}$ constant and hence difficult to construct a device which would retain calibration. In Equation 2 which represents a more workable expression of the theory of operation of the structure of the invention herein, since the structure is constructed to positively maintain $I_{ap}$ at a constant value irrespective of changes in aperture impedance and the like, the value of $i_0$ is reliably and continuously ascertainable at all times.

As mentioned, the amplitude of the signal from the prior structure is desirably proportional to the size of the particles for small particles. There is a factor which is involved as the size of the particles increases which provides an error, but the error amounts to less than 1% for volume ratios, that is $V/v$, greater than 1000. The same relationship holds true for the signals in the invention herein, but in the case of the prior structures and the structure represented by Equation 1, the factor changes because of increased voltage at decreased volume ratios to a much greater extent than in the invention herein.

In other words, the error in proportionality which increases with volume ratio is much less in the case of a current sensitive output amplifier with a constant current aperture than it is in the case of the voltage sensitive amplifier with a constant current aperture.

The input amplifier referred to which is current sensitive is a low impedance structure, the ultimate of which is a short circuit across the aperture, but which is limited by the nature of the tube circuit into which the aperture must operate. This limitation is not a serious deterrent for practical arrangements. Most of the benefits are obtained when the input impedance is a small fraction of the impedance of the aperture contents.

Many other objects and advantages of the invention, in addition to those enumerated will be brought out in the ensuing description of a preferred embodiment, in which the essential details of the invention will be explained as required by the patent laws in connection with circuit diagrams and charts, primarily diagrammatic in nature and using for the most part conventional symbols. In such explanation, the advance which has been made in the arts and sciences will become apparent to those skilled in this art, and while theories have been set forth by way of explanation, these are not intended to be limiting, irrespective of whether correct or not.

In the drawings:

FIG. 1 is a block diagram of a complete particle analyzing device constructed in accordance with the invention herein.

FIG. 2 is a greatly enlarged fragmentary sectional view, more or less diagrammatic in nature, showing the aperture of the inner vessel of the arrangement of the upper left-hand corner of the diagram of FIG. 1.

FIG. 3 is a series of wave shapes, showing the progress of a pulse caused by passage of a particle through the aperture of the apparatus through the various parts of the block diagram, the various wave forms being all based upon the same horizontal time scale, but having different vertical voltage scales.

FIG. 4 is a sub-block diagram of the pre-amplifier of the block diagram of FIG. 1.

FIG. 5 is a circuit diagram of the structure of FIG. 4.

FIG. 8 is a circuit diagram of the main amplifier of the block diagram of FIG. 1.

GENERAL CHARACTER OF INVENTION

The invention is characterized by providing in a particle analyzing device of the character in which there is an aperture through which a suspension of particles is adapted to flow, and a current is provided flowing through the aperture or an electrical field is established across the aperture from a body of fluid on one side of the aperture to a body of fluid on the other side of the aperture, the fluid carrying the suspension, means for detecting the passage of the particles through the contents of the aperture, which comprises, a circuit providing a constant current in the aperture, irrespective of variations in the impedance of the aperture, and a sensing device which is sensitive to changes in the current of the aperture caused by the passage of a particle.

The invention is also characterized by other details which comprise a very high impedance D.C. source of current connected across the aperture and a very low input impedance amplifier connected also across the aperture.

Figure 6:
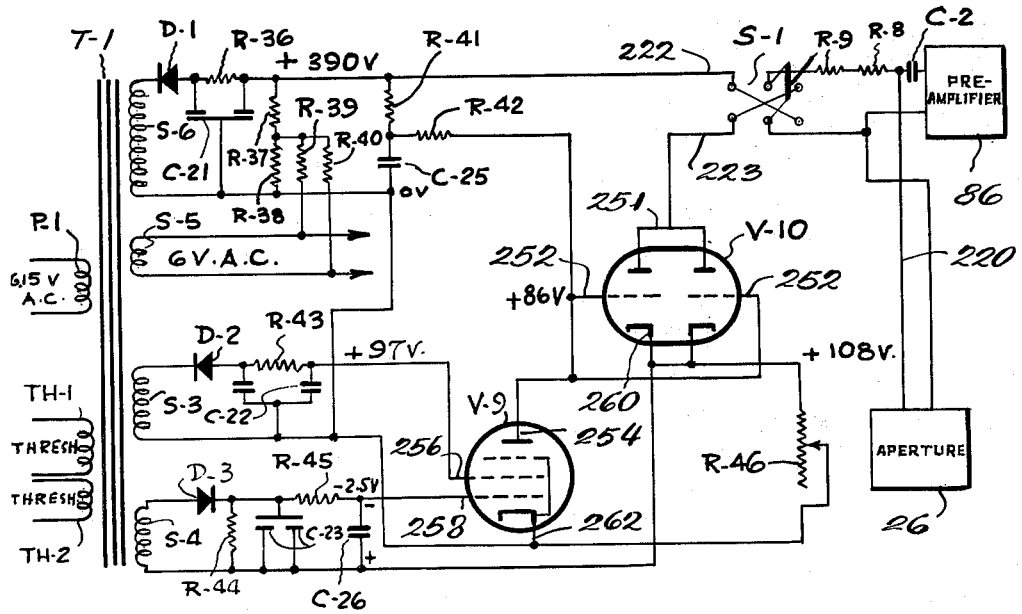
FIG. 6 is a circuit diagram of the regulated current supply for the aperture also showing the relationship of the voltage sources for the threshold circuits.
Figure 7:
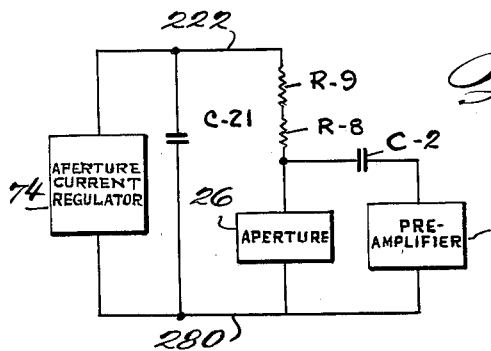
FIG. 7 is a diagram used in explaining the operation of the regulated power supply for the aperture.

Referring now to FIG. 7 for the purpose of discussing the basic concept of the invention, the circuit shown is in block form but actually represents electrical circuitry. The block 74 consists of all of FIG. 6 to the left of the switch S–1 except that the condenser C–21 is shown independently since it provides a short circuit for A.C. to the A.C. ground which may be theoretically designated in FIG. 7 as 280. This may not necessarily represent a chassis ground, since the plate circuit of the output of the regulated aperture supply is opened and connected across the aperture as will be seen.

The conductor 222 has isolating resistors R–8 and R–9 therein, of about 100,000 ohms and 5,000 ohms respectively, with the aperture 26 and the pre-amplifier 86 connected in parallel at least signalwise with one another and in series with the resistors. The condenser C–2 couples the A.C. signal from the aperture to the pre-amplifier and keeps D.C. out of the amplifier.

The regulator 74 serves as an "infinite" impedance source of constant current, maintaining this D.C. current through the aperture 26 regardless of the impedance of the aperture, limited only by the resistance of the isolating resistors R–8 and R–9. The isolating resistors R–8 and R–9 comprise means to prevent the A.C. aperture signal from being shorted by C–21. These resistors force the signal current from the aperture to prefer the low impedance pre-amplifier, which takes the greatest share and hence has the most of the signal current.

Since the regulator 74 is a constant current device, the D.C. component of the aperture current will be constant and variations in its impedance for any cause will have no effect upon the signal.

The input impedance of the pre-amplifier 86 in the practical example will be approximately 40 or 50 ohms, at most 100 ohms, and the impedance of the aperture contents will normally range from a few thousand to 75,000 ohms.

The invention is embodied in an apparatus which has been illustrated in block diagram form in FIG. 1. This structure is provided to perform the following general functions, although these functions may be augmented or decreased in other examples:

(1) The particles, suspended in a given liquid to form a suspension which is usually of known dilution, are passed through a scanning aperture, and a signal is produced for each particle (except for statistically predictable coincident passage), the amplitude of which is very closely a direct function of the volume of the particle.

(2) The apparatus has a counter which indicates the number of pulses sensed by the apparatus in a given length of time, the counter being mechanical, electronic, or a mixture of both, and being readily resettable.

(3) A siphoning arrangement which includes a mercury manometer operating in connection with a metering section of the manometer enables the amount of fluid scanned to be accurately and automatically measured. Other forms of flow control, metering and start-stop control can be used.

(4) A cathode ray display of the pulses is provided, in which the pulses, whose amplitude is normally proportional to the size of the particle, are shown as vertical spikes or pips on a horizontal base line.

(5) Threshold circuits with suitable adjustable controls enable the apparatus to accept or reject pulses of certain heights, or between at least two limits.

(6) The constant current source is provided, the low impedance pre-amplifier accepts the aperture signal, the main amplifier provides quick-recovery characteristics without sacrificing the operating-point stability generally associated with A.C. coupled amplifiers.

(7) There is a debris alarm which gives visible and/or audible warning if and when a large particle blocks or remains lodged in the aperture.

(8) A common source is provided for furnishing voltages for the threshold and current regulator circuits.

(9) A structure is provided for controlling when the counter will be energized or disabled for each pulse, with relation to its amplitude compared with the thresholds.

(10) The pulse which is produced is inverted, whenever needed, by electronic switching means so that the output to the display and counting circuits is always a positive signal.

In addition to the above, there are many functions which are performed by the apparatus to accomplish various specialized purposes, many of which are obvious and known, and others of which will be discussed hereinafter. Some of the functions mentioned above are performed in the prior structure, but for the most part, the structure and functions are new, and the means for performing old functions are more efficient, simpler and more reliable, and give better results.

In the discussion of FIG. 1, reference at times will be made to the wave shapes for a typical pulse, shown in FIG. 3 at A through P, it being assumed that this is a large pulse which exceeds the upper threshold and is to be discarded, that is, not counted.

DESCRIPTION OF BLOCK DIAGRAM

Referring now to FIGS. 1 and 2, the apparatus shown in simple diagrammatic form in the upper left-hand portion of the figure is often referred to as the sample stand, since it is usually mounted on some form of standard which supports the same and permits the test suspensions to be associated therewith. This is designated 20 generally, and comprises basically a pair of vessels 21 and 22 of some insulating material, the inner being a closed tube and the outer being a simple beaker or the like adapted to be brought up to the tube so that the bottom end of the tube is immersed in the body of suspension 24 carried in the outer vessel 22. The lateral wall of the inner tube 21 is provided with a fine aperture 26 which, in most instances, ranges from 20 to 200 microns in diameter. The interior of the tube 21 is filled with a suspension in the form of a body 28 which may or may not be the same as that of the body 24. The body 24 has suspended particles whose concentration or properties it is desired to study. The upper end of the tube 21 is connected to a source of vacuum through a valve 30 and to a manometer-syphon structure 32.

The manometer-syphon structure comprises a simple U-shaped mercury manometer arrangement having a relief capillary tube 34 open to the atmosphere, a measuring section 36 of connected capillary tubing, preferably arranged horizontally or nearly so, and a vertical section 38 which connects with the upper end of the tube 21 through a reservoir 40. The scanning aperture 26 is shown in exaggerated scale in FIG. 2. The lateral side wall of the tube 21 is provided with an orifice 42 over which there is fused an annular wafer 44 of sapphire, preferably. The central opening of the wafer 44 comprises the aperture 26, and it may be as small as a few microns or so in diameter or as great as several hundred microns. If a vacuum is applied to the fluid body 28, it will suck fluid from the body 24 through the aperture 26, and as this occurs, any particles which are suspended in body of fluid 24 will also pass through the aperture 26. Particle 46 is shown moving in the path illustrated by the broken line from one vessel 22 to the other vessel 21.

The aperture 26 is the principal or only electrical and physical path existing between the two vessels 21 and 22, and if there is a potential which is applied to the electrodes 48 and 50 suspended respectively in the vessels, the only flow of current possible is through the aperture. The prior structure had a current flow through the aperture which was permitted to vary in accordance with the impedance of the aperture contents. The impedance of the aperture contents is dependent upon temperature, the ion concentration and other factors. The particles such as 46 have a different conductivity than the suspension in the aperture 26, and hence, as they pass through the aperture, they change the impedance of the aperture contents. This change modulates the potential across the aperture and produces a detectable signal, or in the case of the preferred structure of the invention herein, where the current supply for the aperture is kept constant and the voltage drop across the aperture is prevented from changing rapidly by the low A.C. input impedance of the pre-amplifier, the current flowing through the aperture is modulated.

The stand 20 provides the modulating signals and the signals or pulses for starting and stopping the counting and sizing apparatus. It has been explained how the modulating pulses are provided, and as for the start and stop pulses, these are produced by means of suitable electrodes at 52 and 54 in the measuring section 36 of the manometer. There is a common or grounding electrode in the capillary tubing at 56.

Assume that the apparatus has been set into operation by energizing the same through suitable power sources. The mercury which is shown as the dark portions of the manometer-syphon structure 32 is equalized in the manometer. With the vessels in the position shown, the valve 30 is opened and the vacuum supply tends to draw the body of fluid 28 through the valve 30. Since the aperture 26 provides greater resistance to passage of fluid than the open-ended manometer-syphon 32, the mercury is raised in the section 38 and this is permitted to continue until the column of mercury has passed to the right of the electrode 54. The valve 30 is then closed, and the mercury column permitted to drop to equalize itself. As the column drops, it syphons fluid by displacement into the tube 21 through the aperture 26. When the column of mercury engages the first electrode 54, it closes a circuit through itself to the electrode 56 and energizes the start circuit 58. In FIG. 1, the connecting lines are to be considered electrical paths or channels rather than connecting electrical leads, although for the most part the paths or channels are the same as electrical connections. The start channel is designated 60. As the mercury passes the measuring or metering section 36, a predetermined volume of suspension is drawn through the aperture 26. When the mercury column reaches the electrode 52, the stop circuit 62 is energized through the channel or path 64. The counter 67 will only record the number of pulses which were produced in the channel 68 during the scanning period, which were permitted passage through the apparatus by the various control circuits. Theoretically, without making any limitations on the size of the pulses accepted or rejected by the apparatus, all of the pulses will be counted and a record had of all the particles which passed through the aperture during the movement of the mercury column along the metering section 36.

As illustrated, the mecury column has just started the apparatus and is passing through the metering section.

The pulse from the manometer-syphon 32 which is applied to the start circuit 58 is in the nature of a positive pulse applied to the grid of a gas-filled thyratron, the operation of which turns on the counting circuit by energizing in turn the delay univibrator 66 on the path 69. The operation of the delay univibrator 66 will be described below. The connection established by the stop channel 64 operates a thyratron also in the stop circuit 62 which short circuits the screen grids of tubes in the pulse amplifier 70 through the path 72 so that the counter circuits have no input.

The aperture current regulator 74 is a vacuum tube circuit which regulates the current in the aperture 26, maintaining it at some predetermined value controlled by the voltage output of the high impedance power supply 76. The path between the aperture and threshold supply 76 and the aperture current regulator 74 is 78. This arrangement will also be described in detail, but is believed to have considerable novelty. The voltage from the power supply 76 provides a reference voltage for the aperture current regulator 74. The same source of supply is coupled to the threshold potentiometers of the lower and upper D.C. cathode follower threshold level sets 82 and 84, the general paths being designated 81 and 80 respectively. This eliminates the need for voltage regulator tubes and other complex regulation and adjustment circuitry in the aperture regulator 74 and the threshold level sets 82 and 84 because it assures that the voltage in the threshold potentiometers is proportional to that which serves as the reference in the aperture current regulator.

Changes in line voltage will affect threshold and regulator circuits in the same proportional manner and hence the proportionality of pulse amplitude relative to particle size will be maintained for constant gain.

All voltages in the apparatus may be obtained from a suitable principal power supply 94 which is fed from an external source such as a power line, and this power supply may include a so-called constant potential transformer maintaining one or more voltages at a fairly constant level. One of these, preferably at some low voltage of the order of 6 volts or so in order to minimize power frequency hum, may be connected to provide the source of the aperture and threshold power supply 76, as indicated by the path 93.

As mentioned in the description of FIG. 7, the pre-amplifier 86 and the aperture 26 are both connected across the regulated power supply of the regulator 74. The block 75 is merely shown as it is for convenience, and could represent the stand 20, together with isolating resistors, reversing switches and the like, and the channels 87 and 80 are only to show that there are appropriate connections between the components.

In the apparatus there are two amplifiers, designated pre-amplifier 86 and main amplifier 88 connected by the channel 92. The input of pre-amplifier 86 is across the aperture 26, as mentioned, and in the preferred structure is a current-sensitive amplifier, having extremely low input impedance compared to the ordinary amplifier. The main amplifier 88 may be a high impedance input amplifier, but is an unusual structure as will be described hereinafter, in which the stages are direct current coupled, but the operating parameters of the amplifier are maintained, thus making the same act as though it were an A.C. amplifier.

The pre-amplifier 86 includes an electronic switching arrangement for the purpose of providing an output signal to the main amplifier of the same polarity, regardless of the polarity of the electrodes 48 and 50. These electrodes are fed current of reversed polarity from run to run, being alternated by a manual switch ganged to the counter reset switch, so that polarizing effects on electrode surfaces will be eliminated to some extent. It will be recalled that the current flowing through the aperture is direct current. A three-stage feedback amplifier provides the needed functions of the electronic switch, the first two tubes having their plates parallel and their cathodes parallel. An electronic switch is used so that mechanical contacts are not required to switch low level signals but switch relatively high level control voltages which do not carry signal components and therefore such contacts may be located at a distance for operating convenience.

Each grid is connected to the opposite phase of a phase inverter which immediately precedes a duel triode and one or the other phase is selected by biasing off the appropriate triode by means of a high negative bias which may be derived from the power supply 94 and applied through a polarity reversing switch to the grid of the desired tube. This will be described in greater detail below.

The main amplifier 88 is a high gain amplifier, the practical example of which had a total gain of about 5000. The output from the main amplifier is applied by the channel 96 to a high pass filter and D.C. restorer 98. The filter is a small condenser of the order of 25 micromicrofarads operating into a diode, serving as a D.C. restorer.

The low impedance output 100 which receives the signal from the D.C. restorer 98 by way of channel 102 is an A.C. coupled augmented cathode follower circuit. The output circuit 100 is required to drive the threshold circuits and hence it is applied by the channels 104 and 106 to the expander amplifiers 108 and 110 respectively. The low impedance output prevents loading by the threshold circuits, that is, the bottom threshold circuit will not load the signal pulse to change the apparent height of the top threshold. The phase inverter 112 is an anode follower receiving the output signal on channel 114 and applying the same to the deflection plates of the cathode ray tube 116 by the channels 118. Other deflection circuits are associated with the phase inverter stage.

The main amplifier also drives the debris alarm 120 by the channel 122. The debris alarm indicates that the aperture 26 is blocked either temporarily or permanently. This circuit can be of a type capable of discriminating between pulses of short duration and a pulse of long duration, discarding the short pulses, and using the long pulse for energizing an alarm circuit. For example, when a piece of debris clings to the aperture 26, there will be low frequencies in the output from the main amplifier which would not otherwise be present. The "long" signal from a piece of debris would cause a substantial shift in the D.C. level of tubes in the amplifier and provide low voltage transients. The debris alarm in this case was a filter which passed signals below about 10 cycles per second and had high discrimination against signals above this frequency. A transient would pass sufficient signal to drive an amplifier and energize a hold circuit and could turn on a light, sound a buzzer, or the like.

As an example of the debris alarm, the signal passed could be applied to the grid of a thyratron tube and bias the same, the tube being connected to energize a relaxation oscillator driving a suitable electromagnetic diaphragm or the like to provide a high pitched tone. This latter structure comprises the acoustic output 124 which is connected with the debris alarm 120 by the path 125. This same acoustic output may be energized by way of the path 126 from one of the glow counter tubes in the counter 66 so that a click is heard for every thousand or so pulses. There is a great advantage in hearing a sound which depends upon the rate of passage of pulses through the aperture, and the variations in cadence can be aurally detected with a suitable arrangement of this kind.

While advantageous, the debris alarm and the acoustic output with its connection to the counter 66 are not essential to the operation of the apparatus, being considered improvements which render the apparatus easier and more convenient to use. Likewise, it must be pointed out that the debris alarm and the acoustic connection with the counter 66 may be used with great advantage in the structure of the prior apparatus.

Referring now to the low impedance output circuit 100, its primary function is to drive the two expander amplifiers 108 and 110. These amplifiers are driven into saturation and provide linear amplification only over a very small range, such as for example 6 volts of the pulse received from the low impedance output circuit 100. This six volt portion is selected by the voltage on cathodes of tubes in the expander amplifiers, and the amount of these voltages is controlled by the threshold level sets 82 and 84. This six volt portion of the pulse is amplified and a segment is selected by the threshold limiters 128 and 130, being applied to these respective stages by the paths 132 and 134. The expander amplifier has a gain of about five and drives the threshold limiter by a segment of a pulse. The threshold limiters are pairs of semi-conductor diodes, and since any six volt portion of the output pulse may be used, the bias on the threshold limiters is fixed. This can be done with resistors having adjustment screws to vary their resistance to any desired values or by using precision resistors.

The band which is being examined can be expanded at will to choose the upper and lower thresholds thereof for examining only pulses occurring within the band.

The threshold limiter, therefore, puts out a substantially square pulse, having an amplitude of the order of two volts, compared with the thirty volts out of the expander amplifier (six volts times gain of five), and feeds it to the brightening and dimming pulse amplifiers 136 and 138 by way of the paths 140 and 142 respectively. There circuits must be capable of passing pulses rapidly, hence the amount of delay introduced by the components there-of must be a minimum. Otherwise, the brightening and dimming pulses applied to the oscilloscope 116 by way of the paths 144 and 146 will not arrive in proper time relationships. The gain of the brightening and dimming pulse amplifiers is of the order of 15, to provide a thirty volt pulse to the oscilloscope to brighten or dim the beam for the period of time chosen between the two thresholds. The sharpness of the pulse and the fast time is achieved by making the band width of these pulse amplifiers several megacycles.

The pulse outputs from the brighten and dimming pulse amplifiers are also applied by way of the paths 148 and 150 to the pulse amplifiers 70 and 152. A network of diodes prevents the tubes of the pulse amplifiers from drawing grid current and insures that small pulses near the baselines of the brightening and dimming pulses are not lost. The pulse is thus further amplified in the pulse amplifiers by about thirty times. The result is that the original pulse from the expander amplifier is by this time quite substantially amplified. If the original pulse from the main amplifier 88 is a very small amount over the lower threshold, that part of the pulse that does get above the threshold will be amplified sufficiently to trigger the delay univibrator 66 by way of the path 454.

Note that there are two of these pulse amplifiers 70 and 152, with their associated duplicate circuitry, so that it is possible to count or not count depending upon whether a pulse exceeds one or both thresholds. If it exceeds the first threshold and not the second, it is counted, if it exceeds both thresholds, the counting is inhibited. This is accomplished in the following manner:

Reference may be had to the wave shapes of FIG. 3, all of which are drawn on the same horizontal time scale but have different vertical voltage scales. These represent the signals in the various parts of the apparatus.

A represents a signal at the main amplifier, shown as a positive going pulse 554 having an amplitude which may be anywhere from a volt to about 100 volts, and which may have a duration of the order of 20 microseconds. This represents a particle such as 46 passing through the aperture 26. The voltage levels which are indicated at 156 and 158 are respectively the lower and upper thresholds defining the amplitude of pulses which it is desired to study. The critical times of the phenomenon occur at 160 when the pulse crosses the lower threshold, at 162 when it crosses the upper threshold, again at 164 when it crosses the upper threshold and at 166 when it re-crosses the lower threshold.

The pulse 554 which appears is greater than the upper threshold level 158, and hence it is desired that this pulse should not be counted. If any pulses are less in amplitude than the level 158 but greater in amplitude than the level 156, it is desired that these be counted. The larger pulse is discussed in order to show the manner in which the device operates.

Through suitable circuitry, the pulse output from the main amplifier 88 is clipped top and bottom, at the two levels controlled by the threshold level sets 82 and 84, and only the portion between these two levels is amplified, so that while the voltage between 156 and 158 is of the order of a few volts, the effective output from the expander amplifiers 108 and 110 is of the order of ten volts or so. The amplitudes of both signals may be the same, but the duration of these signals is different. In FIG. 3 the clipped signal from the lower threshold expander amplifier 108 is at B while that from the upper threshold expander amplifier 110 is at C.

A small portion of the pulses B and C are chosen, between the broken lines, amounting to about two volts, but again of different durations, and the resulting output pulses are D and E. This function is performed in the threshold limiters 128 and 130 respectively. These pulses are applied to the grids of amplifiers in the brighten and dimming pulse amplifiers 136 and 138 which amplify the same to about thirty volts as shown at F and G. From these amplifiers, by way of the paths 144 and 146, the trace of the cathode ray tube is brightened only for the duration of the pulse while between the thresholds 156 and 158. This is done by using the lower threshold initiated signal F to brighten the trace, and the upper threshold initiated signal to dim the trace, the former being applied to a control grid of the gun of the cathode ray tube 116 and the latter to the cathode of said tube.

A small portion of each of the signals F and G, as determined by the broken lines thereat, is applied to the pulse amplifiers 70 and 152 respectively. These signals are shown at H and I respectively and as will be seen, they are just a few volts in amplitude but still of different durations. By this method, it is insured that pulses that barely graze a given threshold probably will be amplified sufficiently to trigger the counting or veto circuits even though they are not high enough above the threshold to produce brightening or dimming. This makes the invention extremely sensitive to pulse amplitudes. The lower threshold initiated signal H is amplified in the pulse amplifier 70 to a square wave of about 130 volts amplitude as shown at J, while the upper threshold initiated signal I is amplified to a square wave of about 250 volts amplitude as at K. Both square waves are negative-going.

The leading edge 168 of the upper threshold pulse K is applied to the control binary 170 by way of the path 172 having been differentiated to provide the trigger pulse 174 as shown at N. The control binary 170 may also be termed the veto flip-flop since it is energized by the trigger 174, and it initiates the production of an output pulse as at P.

The pulse at P is negative going, as will be seen, and it is applied to an "AND" circuit 176 by way of the path 178. The pulse which would normally be produced by the trailing edge 180 of the square wave K is rendered ineffective by suitable biasing diodes, as the case with other unwanted pulses.

Simultaneously, the trailing edge 182 of the square wave of J, the upper threshold pulse, is differentiated to provide a trigger pulse 184, suppressing the initial pulse caused by the leading edge 586, and this trigger is applied to the delay univibrator 66.

The pulse P applied to the "AND" circuit disables the same by biasing the grid of a tube below cut-off, for example, serving as a gate, so that so long as there is a pulse such as P, there is no output from the "AND" circuit. Recall, however, that this disabling pulse was initiated by the upper threshold being crossed, and hence, if the upper threshold had not been crossed, there would be no pulse P, and signals applied to the "AND" circuit by other parts of the device will get through.

The trigger pulse 184 of the wave shape L is applied to the delay univibrator 66 to provide an output square wave like that shown at M. This is applied by way of the path 186 to the "AND" circuit 176, the univibrator being constructed to restore itself to quiescent condition a few microseconds after the trigger 184, to form the square wave. If the gate is open, the signal of M will pass through the "AND" circuit and energize the counter 67 through the channel 188. The trailing edge 190 of the square wave M is differentiated to provide a trigger pulse 192 as shown at O which is applied to the control binary 70 along the channel 194 to restore the flip-flop to its original condition.

We may thus consider three types of pulses, those that are of amplitude less than the bottom threshold level 156, those that are of amplitude greater than the upper threshold level 158, and those which are of amplitude between the two threshold levels. Any pulses produced which are greater than the upper level will be discarded because the disabling output from the binary control 170 will prevent them from going through the "AND" circuit to the counter 67. Any pulses which are smaller in amplitude than the lower threshold level will fail to produce the trigger pulse 184 and will not energize the delay univibrator. All of the other pulses will produce counts.

The block diagram also illustrates another channel designated 196 which applies a signal from the control binary circuit 170 to disable the delay univibrator 66 until the control binary has completely recovered following the pulse of P. This feature is important from the standpoint of obtaining important statistical determinations of pulses counted. Consider a dense population in which a very small percentage of particles come within a given pair of threshold levels, the remainder being much larger particles it is desired not to count. If, in using the apparatus, a single non-wanted particle is counted, it represents an error which is quite substantial, especially if the percentage of wanted particles is a fraction of one percent. The disabling of the univibrator immediately following each large signal will prevent an almost immediately following pulse from being counted, irrespective of whether it is large or small, but the spread of the smaller particles is so great that the chances of losing the count of a small particle because of this delay are considerably less serious than counting an unwanted particle.

Figure 9:
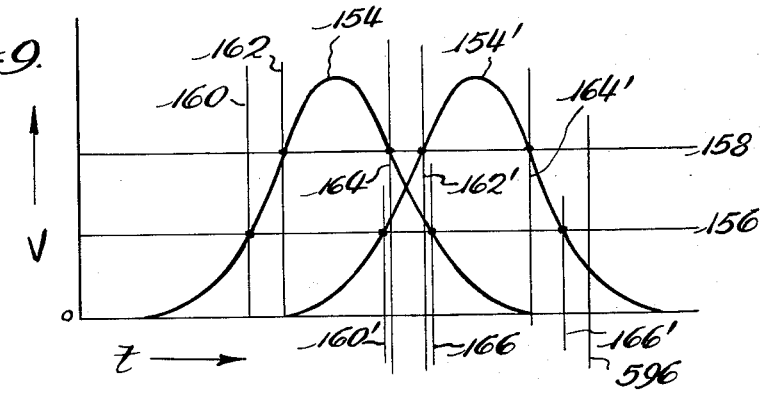
FIG. 9 is a chart showing the conditions existing in the apparatus when two large pulses occur in quick succession and illustrating the manner in which the second is prevented from operating the counter.

The wave shapes of FIG. 9 illustrate the problem through the use of two pulses 154 and 154′ occurring one after the other. The critical times of crossing the thresholds are the same as in A of FIG. 3, except that the times for the pulse 154′ are primed. The crossing of the threshold 158 at time 162 controls the production of the trigger pulse 174 and the subsequent disabling pulse P. Note that a second pulse 154′ has appeared, and it is also of greater amplitude than the threshold 158. Its critical time for causing the operation of the binary control to produce the disabling pulse is 162′, but note that the critical time for counting the first pulse is 166 and the restoring trigger 192 occurs some time later. Thus, when the new critical time for initiating the production of a trigger similar to 174 arrives, which is 162′, the flip-flop of the binary control 170 is still producing a disabling pulse as at P. By the time the pulse 154′ crosses the lower threshold at 166′, the binary control has been restored and since there was no trigger similar to 174, there will be a signal passing through the "AND" circuit, and the pulse 154′ will be counted.

The structure which is used to prevent this is circuitry which disables the univibrator 66 after a large pulse such as 154 appears for a period of time permitting the flip-flop to be restored thereby not permitting counts of pulses immediately following the pulse 154. For example, the disablement of the univibrator may extend to the time 596 which prevents the pulse 154′ from producing a count signal when it crosses the threshold 156 at 166′.

Statistical corrections ascertained by experiment and computation related to coincidence resolution and coincidence passage of particles through the aperture are normally applied to determination which minimize the effect of not counting small pulses in a large population.

The above description provides an overall picture of the operation of the apparatus, and for the most part indicates the manner in which many of the desired functions are carried out. Some of the components are capable of considerable variation as to exact circuitry without changing their functions.

SIGNAL PROPORTIONALITY AND CONSTANT CURRENT APERTURE SUPPLY

The above heading actually encompasses two subjects, but only because they are both illustrated and discussed in connection with the same circuit diagram, FIG. 6.

As explained, in the prior structure the threshold circuit and the aperture current circuit were independent of one another and it was difficult to maintain constant voltage supplies for both, since any change in one would introduce error into the proportionality relationship between pulse amplitude and particle diameter.

In this invention the same supply voltage is used for the aperture current circuit and the threshold circuits. Because of this, proportionality of the signals throughout the apparatus is maintained regardless of changes of line voltage since the same changes which occur in the aperture current circuit will also occur in the threshold circuits. In the block diagram of FIG. 1, this is shown by providing the same power supply 76 which serves as a source for both the aperture current regulator 74 and the two threshold level sets 82 and 84.

Referring now to the circuit diagram of FIG. 6, which is the actual circuit of the power supply 76 and the aperture current regulator 74, the transformer T–1 is shown for supplying the necessary power for the several components involved, namely, the current for the aperture and the threshold power. The regulation of the current supply for the aperture is achieved as will be explained, in connection with a circuit whose direct current power is obtained through rectification of the output voltages of the secondary windings S–3 and S–4 of the transformer. The common source or transformer primary is shown at P–1. The threshold secondary windings are at T$h$–1 and T$h$–2. These windings are very closely coupled with the secondary windings S–3 and S–4, and with the primary P–1 preferably being wound directly upon the same portion of the core, so that the coupling between all of these windings is extremely close.

It has been stated above that the important aspects of the invention are concerned, among other things, with the provision of an aperture current which is maintained substantially constant at all times. Of course, this refers to the current within the aperture since the supply current is not modulated. It has been pointed out, for example, that changes in the impedance of the aperture contents will not affect the signal output providing the aperture current is kept constant.

This is achieved by providing automatic regulation of the current source which tends to resist any changes in the current supplied to the aperture.

The transformer T–1, in addition to the windings P–1, T$h$–1, T$h$–2 and S–5 (the latter being a filament voltage winding with center neutralized by resistors R–37 to R–40), has the windings S–6, S–3 and S–4. S–6 is a high voltage winding, operating through rectifier D–1, filter R–36, C–21 to provide the high positive voltage terminal for the aperture circuit, and through dropping resistors R–41 and R–42 to provide positive voltage of the order indicated on the diagram for the grids 252 of the tube V–10 and the plate 254 of the pentode V–9.

The winding S–3 operates through the diode D–2 and filter R–43, C–22 to provide a high positive voltage for the screen grid 256 of the pentode V–9, the windings S–6 and S–3 having a common ground.

The winding S–4 operates through the diode D–3, and the filter R–44, C–23 and the dropping resistor R–45 and filter C–26 to apply a low negative voltage at the control grid 258 of the pentode V–9, the positive voltage being applied to the cathodes 260 of the tube V–10 through the multi-step resistor R–46. Note that the lower end of the resistor R–46 is connected to a common conductor with the other windings S–3 and S–6 and to the cathode 262 to place the control grid 258 several volts below zero potential (OV).

The resistor R–46 controls the amount of current flowing in the tube V–10 and hence the current flowing in the aperture 26. Note that the plates 251 of the tube V–10 are connected by the conductor 223 through the polarity reversing switch S–1 to the aperture 26 and the input to the pre-amplifier 86. The D.C. circuit is completed through the aperture 26 by way of isolating resistors R–8 and R–9 through the polarity reversing switch S–1 and the conductor 222 to the positive terminal of the rectifier circuit of S–6.

Conveniently, the rectifier circuit served by the winding S–3 is an independent power supply circuit for the screen grid 256 of the tube V–9.

The rectifying circuit of the winding S–4 is a reference voltage supply between the cathodes 260 of the tube V–10 and the control grid 258 of the tube V–9 against which the voltage across the resistor R–46 is compared. The voltages are bucking as will be seen, so that there may be large voltages in R–46 and very small changes will be reflected in the voltage between the grid 258 and the cathode 262 of the tube V–9. The plate 254 of the tube V–9 is connected to the grids 252 of the tube V–10. If during the course of use of the apparatus, there is a change in the total current flowing through the tube V–10, which of course is the aperture current, it will appear as a change in the voltage across the resistor R–46, and this will affect the flow of current in the tube V–9 because the voltage is continuously being compared with the voltage of the reference circuit. This bias between the grid 258 and the cathode 262 will be affected.

This change will be reflected in a change in the current flow through the plate circuit of tube V–9 and since this plate circuit is connected to the grids 252, any change in current flow through V–10 will be resisted by raising or lowering the grid-cathode voltage.

This circuit is extremely sensitive, since the grid of the tube V–10 has to swing very little to cause large changes in plate current. The tube V–9 is working very conservatively, and the results will be a highly stable and reliable circuit, maintaining constant aperture current for wide changes in aperture impedance.

LOW IMPEDANCE INPUT PRE-AMPLIFIER

As stated above, another of the important features of the invention comprises the use of a current sensitive amplifier as the sensing circuit following the aperture, to receive the signal in a low input impedance stage so that the signal will be independent of suspension conductivity and the error in the proportionality between signal amplitude and particle size will be minimized for large particles, compared with aperture volume. The block of FIG. 1 which comprises this portion of the apparatus is designated pre-amplifier 86. The individual parts of this circuit may be seen in detail in the sub-block diagram of FIG. 4.

The aperture current regulator 74 has the constant current supply and applies a current to the aperture 26, the output from the aperture due to the presence of a particle being a change in current because of the low impedance input of the amplifier. This signal is applied to the pre-amplifier input. This first signal is injected into the cathode of a grounded grid amplifier 200 which has a low impedance input. This is a current amplifier, since the voltage on the cathode of the grounded grid amplifier tends to remain constant. There is a control circuit through an amplifier designated $g_m$ multiplier 202 which receives a portion of the incoming signal at 87, amplifies it, and applies the resulting output to the grid of the grounded grid amplifier, so that if the signal tends to raise the grid cathode voltage of the grounded grid amplifier, the $g_m$ multiplier tends to lower it. This in effect increases the conductance and lowers the input impedance of the stage 200. The output from this stage 200 is applied to a cathode follower 204 being directly coupled thereto by way of path 206. The cathode follower 204 operates by way of the path 209 into a phase splitter 208 whose output are applied to the electronic switching stage 210 through channel 212. The output from the electronic switch 210 is a positive going signal regardless of the polarity of the aperture, and this appears at 214, is applied to an amplifier 216 which in turn drives the cathode follower 218 by way of path 220. The output of the cathode follower 218 is applied to the input of the amplifier 88 by the channel 92. We have determined that also feeding back a large part of the output voltage of cathode follower 218 to the switch 210 minimizes effects of differences between tubes V–5 and V–6 of the switch.

The circuit details of the pre-amplifier as embodied in a practical structure are shown in the circuit diagram of FIG. 5. The aperture signal appears on the lead 87 which is connected through isolating resistor R–8 to either the positive or negative terminal of the constant current supply in the aperture current regulator 74. The switch S–1 ganged to the switch S–2 controls this polarity. Leads 222 and 223 extend to the constant current source. Condensers C–3 and C–4 and the resistor R–9 comprise a filter, and the resistor R–8 is an isolating resistor. The current pulse from the aperture, which is produced only when there is a particle passing through, is injected into the cathode 224 of the tube V–1 by way of the conductor 226, the condenser C–2, the tube V–1 and its plate resistor R–7. Filter capacitor C–3 is connected to ground. Negative D.C. feedback is applied to tubes V–1 and V–3 by means of lead 227 from cathode 224 of V–1 and resistors R–2 and R–3 to stabilize their operating at optimum values and provide low frequency signal coupling. N–1 is a neon tube which serves as a regulator.

The grid 232 of the tube V–1 is connected to the plate 234 of the tube V–3 through the parallel resistor R–2 and condenser C–1 so that the output of the tube V–3 raises or lowers the voltage on the grid 232. Note that the grid 236 of the tube V–3 also receives the signal which appears in the conductor 226 and hence it will amplify it but also invert it in its plate circuit. Thus, if the voltage on the cathode 224 tries to go down, the tube V–3 will try to raise it, and vice versa. This tube V–3 is the $g_m$ multiplier referred to. It may be considered in the nature of a feedback arrangement maintaining constant voltage level at the cathode of V–1.

The condenser C–1 and the parallel arrangement with the resistor R–2 assures coupling of the low frequency components of any signal which may be applied through the tube V–3. The tube V–2 is a cathode follower and hence the output is taken off its cathode 238, the condensers C–6 and the resistors R–5 and R–6 being part of a network to also assure good frequency response for a rather wide band. R–12 is a cathode dropping resistor and C–7 is a coupling condenser to couple the signal to the tube V–4 which functions as a phase inverter, but which is termed a phase splitter because its plate 240 is connected to the grid 244 of tube V–6 while its cathode 242 is connected to the grid 246 of the tube V–5. The cathodes and plates of tubes V–5 and V–6 are connected together so that regardless of the signal inputs to the respective grids, the outputs will be the same. The cathodes are connected through a cathode resistor R–24 to ground. The plates are coupled through capacitor C–15 to an amplifier tube V–7 which is conventionally biased and which has a broad band coupling C–17 and R–31 to the cathode follower tube V–8, the output of which is taken off the cathode 248 through resistor R–34 and applied to the main amplifier 88.

In operation, the arm of the switch S–2 will be on one or the other of the contacts 250 or 252. If on 250, the tube V–5 is in the circuit since the grid circuit is completed to ground by way of resistors R–19 and R–21. The resistors R–17 do not render either tube V–5 or V–6 sufficiently conductive to pass a signal. If the arm is on contact 552, the grid circuit of tube V–6 is completed to ground through resistors R–18 and R22. The signals at 240 and 242 are opposite in polarity, although the same signals—and the switching by the use of the switches S–1 and S–2 assures that regardless of the polarity of the signal, the output from the tubes V–5 or V–6 will be positive going. A negative going signal input to tube V–4 will be positive at the plate 240 and negative at the cathode 242, and hence, the tube V–5 will be used for amplification to give a positive going signal at the lead 250. A positive going signal input to tube V–4 will be negative going at the plate 240 and positive going at the cathode 242 and hence tube V–6 will be used to provide a positive going signal at the plates 250.

Either desired polarity of output may be achieved by this arrangement.

The polarity of the aperture current is switched every other determination, to minimize the effects of possible galvanic action or hydrolysis in the suspension. In those cases where an A.C. current is used in the aperture, the electronic switch and its associated circuitry are not needed.

QUICK RECOVERY AMPLIFICATION

Assuming particles which are spherical, the difference in volume between particles of different diameters varies as the cube of the diameters. Thus, the difference between two volumes of two particles which differ in diameter by a ratio of ten to one is a volume difference of a thousand to one. Since pulse amplitude is closely proportional to pulse volume and not pulse diameter, the amplifier of the apparatus must be equipped to handle pulses of greatly differing amplitudes for maximum utility in laboratory applications. Condenser circuits must be capable of immediate restoration and sensitivity to passage of pulses of widely varying amplitudes.

The conventional amplifier is not able to recover quickly from high amplitude signals, and as a matter of practicability, where a given problem requires the handling of signals of greatly varying amplitudes, in the past several amplifiers would be used, each constructed to handle one range of signals to the exclusion of others.

The problem in this case is solved by using direct current amplification to avoid the use of coupling condensers or any signal storing components that will store a charge following a saturating pulse, but by modifying the circuitry to offset the basic difficulties with D.C. coupled amplifiers. In direct current amplifiers the D.C. level of the input signal is unstable, especially at high gains, which are needed in apparatus of this kind in order to study small and large particles simultaneously, and for many other reasons. In the invention, the advantages of both A.C. and D.C. amplifiers are combined by using the coupling system of a D.C. amplifier and the feedback system of an A.C. amplifier. The operating point is stabilized by feeding back the D.C. level at the output to the amplifier input. This makes the amplifier appear to be an A.C. amplifier, but it is not.

The main amplifier as shown on the block diagram at 88 is represented on the circuit diagram of FIG. 8 as the tubes V–11, V–12, V–13, the right-hand section of tube V–14 and the left-hand section of tube V–15.

The signal out of the pre-amplifier 86 (see FIGS. 1, 4 and 5) is a negative going signal which is applied through the resistor R–34 in the conductor 92 through the coupling condenser C–30 to the grid 300 of the pentode V–11. The pentode V–11 in turn has its plate 302 connected through the resistor R–53 directly to the grid 304 of the pentode V–12. The plate 306 of the pentode V–12 is connected through the resistor R–58 directly to the grid 506 of the pentode V–13. The plate 308 of this tube in turn is connected through the high pass filter and D.C. restorer 98 and a coupling condenser C–45 to the grid 310 of the right-hand section of the tube V–15, the plate 312 being connected to the next stage.

The three tubes V–11, V–12, and V–13 are direct current coupled as will be seen, the resistor couplings being R–53 and R–58 shunted respectively by very small condensers C–31 and C–33. Three feedback connections are effective to stabilize the amplifier and these are designated 313, 314 and 315. Feedback path 314 is connected directly to the screen grid 316 of the tube V–11, by-passed to ground through the capacitor C–46, and the path 315 is connected to the grid 300 through a 220,000 ohm resistor R–50. The cathode 320 of tube V–13 is connected through feedback conductor 313 to the cathode 318 of tube V–11 which is connected to ground through a dropping resistor R–51. This feedback stabilizes the amplifier gain. The cathode 322 of V–12 is connected directly to ground. The screen grids of tubes V–12 and V-13 are conventionally connected with dropping resistors R-57 and R-60 to a suitable B+ supply and by-pass condensers C-34 and C-35 to ground. Plate load resistors for the three tubes are R-52, R-56, R-60, all connected to B+ supplies of suitable values, adjusted by resistors R-55 and R-61 and suitably by-passed by condensers C-32 and C-47. The B+ supplies of these tubes as well as the others are conventional and need not be further described.

The shunting condensers C-31 and C-33 are of the order of 3 micro-microfarads and are for high frequency compensation, to keep the pulses passing through the amplifier sharp.

The three stages represented by the tubes V-11, V-12 and V-13 have a combined gain of approximately 5000, in a practical version, this gain being required because of the large amount of feedback needed to stabilize the amplifier.

The signal output from the tube V-13 appears at the plate 308 as a positive going signal and this signal is applied to the grid 326 of the right-hand section of tube V-14 through the resistor R-80 of the voltage divider R-80, R-82 connected from plate 308 to a −150 volts high impedance source. The same signal from the plate 308 is coupled to the left-hand section of tube V-15 through a very large resistor R-81 which is by-passed to ground through a very large condenser C-41, the signal being applied to grid 328 of the left section of tube V-15.

The time constant of the input network of the tube V-15 which has just been described is very long, typical values of R-81 and C-41 being 10 megohms and 2 microfarads respectively. The output of this section of the tube V-15 is taken off the cathode 330 which has a cathode resistor R-74 connected to ground, of a conventional value. The conductor 314 therefore has a voltage which is substantially without signal, but which is a D.C. that has a value corresponding to the D.C. level of the signal at the plate 308. The left section of tube V-15 is a cathode follower to avoid loading. The left section of tube V-15 is therefore in the nature of a filter with the ability of filtering out the signal and leaving the D.C. component.

The connection 314 is extended back to the screen grid 316 of the tube V-11. This in effect is a very low frequency feedback for the D.C. component, which adjusts the zero base for the signal automatically, preventing drift which is inherent in a D.C. amplifier. This is done by adjusting the screen voltage of tube V-11 to compensate for tendency to drift, and this stabilizes the D.C. voltage on plate 308 at all times. As an example of what could occur, a negative going signal on grid 300 of tube V-11 of a conventional amplifier would cut the tube off and the voltage of the plate 302 would suddent rise and make tube V-12 conduct to saturation, drawing grid current. Coupling condensers would accumulate charge and this, leaking off would cause the drift of the base of an A.C. amplifier.

The third feedback path comprises the connection 315. The signal is applied as stated before to the right-hand section of the tube V-14 which is a cathode follower. The output off the cathode 340 is applied through diode D-4 to a network consisting of condensers C-36 and C-37 and the resistors R-69, R-70, R-71 and R-72 to provide an negative signal to grid 300 for raising the base line of the signal input when especially large signals tend to drive it down. The diode D-14 is normally biased to be cut off so that only large signals will affect this structure. In effect, the circuit is a delayed rectifier circuit for lifting the base line and preventing it from going so negative that no amplification is possible in the amplifier. Without this arrangement very small pulses in the presence of very large pulses could not be detected. This could also be called automatic operating point control.

This amplifier is unusual in that it uses a D.C. amplifier with the benefits of an A.C. amplifier. An A.C. amplifier used for the amplication of pulses of the nature here studied would choose a D.C. voltage level which is not constant. This would thus cut off the tops of big pulses or drop down so low that it would lose little pulses. In this case, the signal is applied to the tube V-11, amplified in V-12, amplified in V-13 and then applied to the output of the amplifier as well as the right section of tube V-14 and the left section of tube V-15. Three feedbacks are provided, one from tube V-13 through conductor 313 back to tube V-11 which is to stabilize gain. The other feedbacks 314 and 315 keep the D.C. level constant and oppose change in that level caused by the advent of very large signals.

The outputs of the amplifier is applied through the coupling condenser C-45 and the high pass filter condenser C-43 which comprises the block 98 in FIG. 1, to the diode D-5 which comprises the D.C. restorer of the block 98. The right-hand section of the tube V-15 is a portion of a unity gain amplifier to provide the output to the expanders. This has been prevously explained.

CONCLUSIONS

The precise details of some of the portions of the apparatus have not been included since while the arrangement is believed novel, circuitry is capable of being worked out by those skilled in this art without the need for specific circuit diagrams.

Considerable variation is possible without departing from the spirit or scope of the invention, as will be obvious.

As remarked in the introduction to this specification, the features of the invention and the expedients used to accomplish the objects which are set forth are based upon structure which is believed novel, some phases being contributive and some being independently responsible for the achievement of certain results. In considering the basic concept of this invention, it is appreciated that the same signal producing device is used, i.e., the two vessels with constricted path and signal produced by causing the passage of a particle to vary the impedance in the aperture while current is flowing through the constricted path, as in the case of the prior structure. Notwithstanding this, the combining of the novel current source and pre-amplifier with the old aperture is believed to operate on such a completely different and unobvious principle as to constitute a new combination. The current sensing amplifier of the invention herein is a radical departure from all previous measurement notions in particle study, since all measurements and studies have been based upon voltage sensing devices. This input coupled with the constant current source for the aperture is a change so unusual that the improvement in results obtained in a practical model were beyond expectations.

It is necessary to point out that the desire to achieve constant current in a particle analyzing device which uses voltage sensing amplification for detection has been present in prior structures, and has been embodied in families of resistors of different values which are connected in networks in the aperture current supply to take care of different conditions of operation of the apparatus. Such ostensibly constant current sources are static or passive, with no capability of self-adjustment to compensate for changes in the conditions under which operation occurs. The difficulty has been that the use of such apparatus has required complex charts and correction factors to be applied, but these have not been able to compensate for impedance changes in the aperture during use, or caused by factors not under normal control, such as temperature. Only the dynamic constant current source of the invention herein is self-adjusting and able to compensate for all such factors.

The use of a current sensing input for detecting the aperture signal could provide improvement in structures which do not have a precise current regulation, and can improve the independence from changes in aperture impedance.

Many of the other features of the invention herein are thus applicable as well to the prior apparatus with improved results.

What it is desired to secure by Letters Patent is:

1. Apparatus for studying the physical properties of particles which comprises, means producing a flow of a fluid suspension containing said particles along a fluid path in a stream whose dimensions are related to those of the particles so that the passage of a single particle through the stream will result in a substantial displacement of the fluid in the stream, an electrical detecting circuit electrically coupled with the fluid of said stream, means establishing a constant electrical current to pass along said stream in said fluid, the electrical properties of the particles and fluid being sufficiently different such that the passage of particles in said fluid path will modulate the electric current flowing along said stream to produce signals, the said detecting circuit comprising a current sensitive amplifier the impedance of which is lower than that of the fluid in the stream whereby the signals will have amplitudes which are susbtantially independent of changes in the impedance of the fluid of said path.

2. Apparatus as claimed in claim 1 in which the current sensitive amplifier is a grounded grid amplifier having cathode, grid and plate and the said signals are coupled into the cathode thereof.

3. Apparatus as claimed in claim 1 in which the current establishing means comprises a source of direct current having an impedance substantially higher than that of the fluid in the path.

4. Apparatus as claimed in claim 3 in which said source of direct current is self-regulated.

5. In a device of the character described and in which means are provided to move fluid from one body of such fluid to another body of fluid through an aperture in a wall separating the bodies of fluid, the fluid of said one body having particles suspended therein so that as the fluid passes through the aperture, it will carry particles with it, means electrically connected to the bodies of fluid to cause an electric current to flow between them but only through said aperture, said means being a source of direct current and the current flow in the fluid of the aperture being constant, the electrical impedance of the particle material being different from the electrical impedance of the fluid, a current sensitive detecting device connected electrically across the fluid in the aperture and direct current blocked against current flowing in the aperture, but adapted to respond to any momentary changes in said electric current flowing through the fluid in said aperture caused by the passage of particles, means for providing said constant direct current comprising: a first amplifier tube having grid, cathode and plate electrodes, a second amplifier tube having at least grid, cathode and plate electrodes, said direct current source having two terminals, the said fluid within the aperture being connected in circuit with the plate electrode of said first tube and extending to a terminal of said source, a voltage dropping device in circuit with the cathode electrode of said fiirst tube and extending to a second terminal of said source and to the cathode electrode of said second tube, the plate electrode of the said second tube being connected with the grid electrode of the first tube, a reference voltage source connected between the grid electrode of the second tube and the cathode electrode of the first tube whereby to oppose the voltage of the dropping device and enable compensation for small changes in current flow of said first tube caused by variations in the impedance of the fluid in said aperture.

6. A structure as claimed in claim 5 in which the first tube is a triode and the second tube is a pentode.

7. In a device of the character described and including passageway means defining an aperture, a body of fluid connected with the passageway means and having particles suspended therein the material of which has an electrical impedance different than the electrical impedance of the fluid, means causing the body of fluid to flow through the aperture carrying the particles along with the same, a detecting device electrically connected to the fluid in the aperture effectively to be in parallel with the total impedance of said fluid in the aperture, a source of electric current connected at opposite ends of the passageway means to the fluid in the aperture to provide a constant electric current therein which is substantially independent of changes in the conductivity of the fluid in the aperture, comprising an electronic amplifier, the fluid of said aperture being in circuit with said amplifier, a current change sensing device in circuit with said amplifier, and a second amplifier connected with the current change sensing device and responsive to any current change sensed by said device occurring in the electric current flowing in said aperture fluid to change the amount of current flowing in said first amplifier.

8. In a device of the character described which includes means supporting a body of fluid having particles suspended therein, means causing the flow of said fluid and particles from said body through an aperture so that particles are carried through the aperture, a current source electrically contacting the fluid at opposite ends of the aperture so as to cause a constant direct current to flow through the fluid of the aperture while the fluid is flowing also, the electrical impedance of the fluid in the aperture being different from that of the particles so that the total impedance of the fluid and a particle when in the aperture will be different than the total impedance of the fluid in the aperture without a particle, and in which an amplifier is arranged to detect any momentary change in the electric current flow caused by the passage of a particle, the invention which comprises, said amplifier being a grounded grid amplifier having a cathode, grid and plate and having the fluid in the aperture electrically coupled to the cathode thereof, and a mutual conductance multiplier coupled with said aperture fluid also and connected with the amplifier to lower the input impedance thereof.

9. An amplifier according to claim 8 in which there is a phase splitter connected to said amplifier and a pair of amplifier tubes connected in circuit following said phase splitter, each connected to one portion of the phase splitter and having a common output, means reversing the polarity of the flow of electric current in the fluid of said aperture from time to time and connecting one of the pair of tubes to the common output, whereby, irrespective of the polarity of the current flowing in said aperture, the signal output from said common output will be of the same polarity.

10. Apparatus for studying the properties of particles suspended in a fluid medium of conductivity different than that of the particles, including passageway means defining an aperture and means for flowing the fluid medium and particles through the aperture, a source of constant current electrically connected with the fluid medium to cause electric current to flow through the aperture in the fluid medium while the fluid medium is physically flowing through the aperture, a detecting device electrically connected in parallel with the fluid medium in the aperture and connected to sense the momentary changes in the total impedance of the fluid medium in the aperture due to the passage of particles therethrough, the source having an impedance higher than the impedance of the fluid medium in the aperture and the detecting device having an input impedance substantially lower than the impedance of the fluid medium in the aperture, said momentary changes causing said detecting device to produce an electrical pulse for each momentary change the amplitude of which is substantially proportional to the size of the particle causing said change, counting means adapted to be driven by selected ones of said pulses and connected to have the pulses activate the same, and means for selecting the pulses comprising a pair of threshold circuits adjustable respectively to threshold voltage levels to pass or reject pulses of certain amplitudes, said circuits being connected in an arrangement to discard and not pass to the counting means all pulses except those whose amplitudes lie between an upper level and a lower level to which said threshold circuits have respectively been adjusted.

11. Apparatus as claimed in claim 10 in which there is a cathode ray display device connected with said detecting device and said pulses are adapted to be applied thereto for visual display upon said device, means connecting said threshold circuits to said cathode ray display device and for providing a display of the levels to which said threshold circuits have been adjusted as horizontal lines upon said display device, and circuit means for brightening the pulses displayed upon said device only between said horizontal lines.

12. Apparatus as claimed in claim 10 in which means are provided driven by any pulse as its amplitude exceeds the upper one of said threshold levels to inhibit operation of said counting means, and means are provided driven by any pulse as its amplitude drops below the lower threshold level to operate the counting means, if not previously inhibited.

13. Apparatus as claimed in claim 10 in which means are provided to prevent operation of said counting means after a large amplitude pulse to eliminate the operation of the counting means by a pulse following the large pulse.

14. In a particle analyzing device of the character described and including an aperture having a conductive fluid containing particles suspended therein flowing through the aperture, an electric current source connected to the fluid in the aperture and applying an electric current to flow through the aperture at the same time that the fluid and particles are flowing, and a detecting device connected electrically across the fluid in the aperture and adapted to produce an electric pulse as a result of the passage of each particle through the aperture, the invention which comprises: means for producing a threshold voltage for measuring the pulses and said means being connected with said detecting device and a common power supply for said last means and the electric current source whereby any change in voltage of said power source will affect the current source and threshold producing means proportionally so as not to change the relationship between the threshold voltage and said pulses.

15. A structure as claimed in claim 14 in which there are two threshold voltage producing means and said power supply is common to both threshold voltage producing means.

References Cited by the Examiner

UNITED STATES PATENTS

| | | | |
|---|---|---|---|
| 2,536,617 | 1/1951 | Weller | 330—97 |
| 2,541,198 | 2/1951 | Brenholdt | 324—123 |
| 2,550,990 | 5/1951 | Gilbert | 330—97 |
| 2,573,523 | 10/1951 | Watters | 330—97 |
| 2,589,133 | 3/1952 | Purington | 250—27 |
| 2,656,508 | 10/1953 | Coulter | 324—71 |
| 2,671,200 | 3/1954 | Lederer | 324—71 |
| 2,680,227 | 6/1954 | Kerns | 324—123 X |
| 2,719,287 | 9/1955 | Bartlett | 340—239 |
| 2,724,022 | 11/1955 | Williams et al. | 324—30 X |
| 2,731,520 | 1/1956 | Richardson | 324—71 X |
| 2,760,184 | 8/1956 | Beattie | 340—239 |
| 2,811,591 | 10/1957 | Kennedy | 330—97 X |
| 2,825,872 | 3/1958 | Stubbs et al. | 324—71 |
| 2,839,619 | 6/1958 | Johnstone | 330—181 |
| 2,869,121 | 1/1959 | Minneman et al. | 250—27 |
| 2,901,609 | 8/1959 | Campbell | 330—97 |
| 2,919,399 | 12/1959 | Brown et al. | 324—57 |
| 2,943,264 | 6/1960 | Anderson | 328—164 |
| 2,970,259 | 1/1961 | Marsden | 324—71 |
| 3,001,175 | 9/1961 | Christoph | 340—13 |
| 3,023,397 | 2/1962 | Reed et al. | 340—15 |
| 3,071,733 | 1/1963 | Holzer et al. | 328—164 |

WALTER L. CARLSON, *Primary Examiner.*

SAMUEL BERNSTEIN, FREDERICK M. STRADER,
*Examiners.*

A. E. SMITH, C. F. ROBERTS, *Assistant Examiners.*